C. Kemper,
Straw Cutter.
No. 111,065.     Patented Jan. 17, 1871.
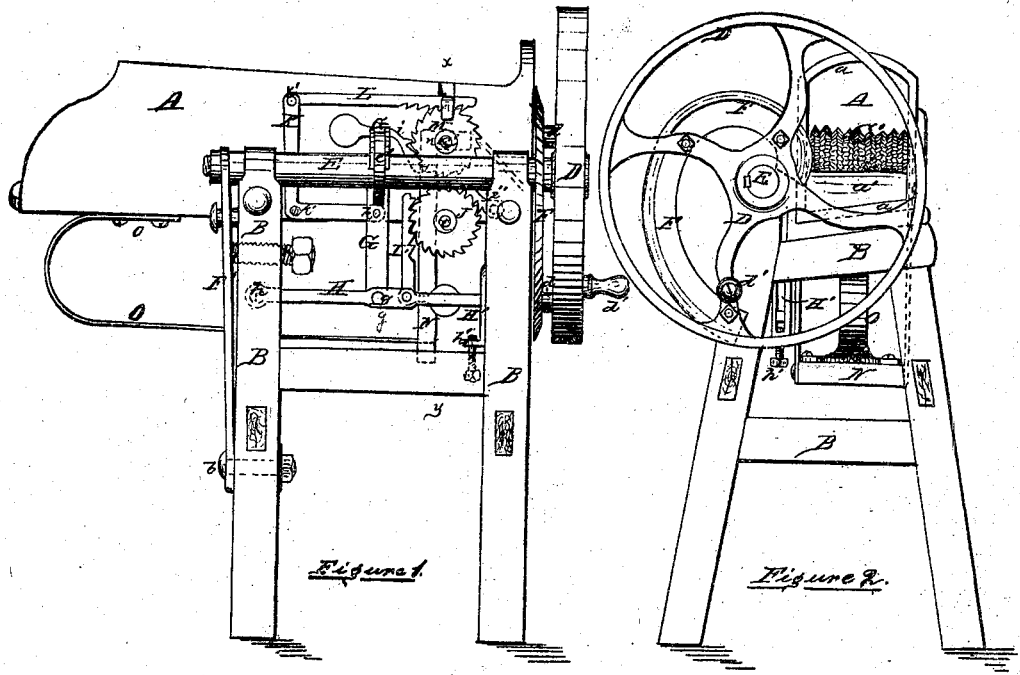
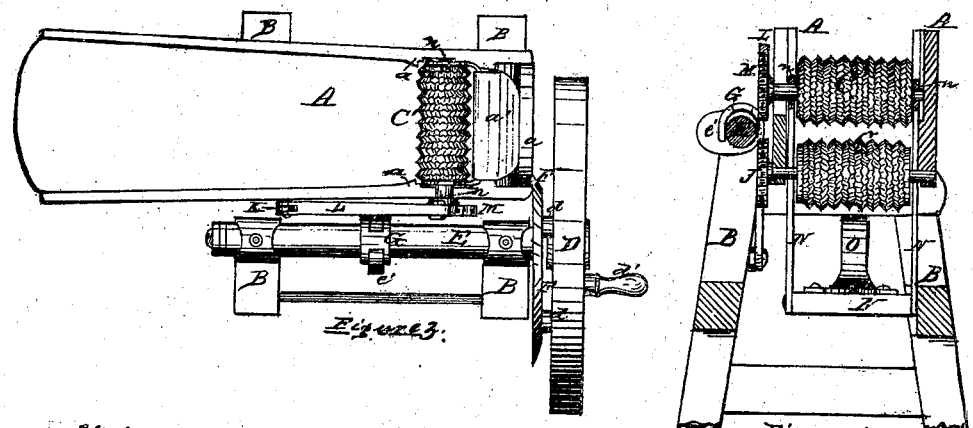
Witnesses:
Robert Burns
J. W. Girthel
Inventor:
Christoph Kemper
by his Attys
Herthel & Co.

United States Patent Office.

CHRISTOPH KEMPER, OF HERMANN, MISSOURI.

Letters Patent No. 111,065, dated January 17, 1871.

IMPROVEMENT IN FEED-CUTTERS.

The Schedule referred to in these Letters Patent and making part of the same.

*To all whom it may concern:*

Be it known that I, CHRISTOPH KEMPER, of Hermann, in the county of Gasconade and State of Missouri, have made certain new and useful Improvements in Feed-Cutters; and I do hereby declare that the following is a full and correct description thereof, reference being had to the accompanying drawing and to the letters of reference marked thereon.

This invention relates to machines for cutting straw, hay and similar feed material; and The nature of this improvement consists chiefly in the arrangement of an eccentric cutter-knife to the arms of a fly-wheel, and to the peculiar combination of levers, ratchet devices, and feed-rollers arranged adjustably to regulate the feed-motion of the stuff to be cut, hereinafter to be more fully described.

To enable those herein skilled to make and use my said improved invention, I will now more fully describe the same, referring to Figure 1 as a side elevation; to Figure 2 as a front elevation; to Figure 3 as a top plan; and to Figure 4 as a part sectional elevation at line $x\ y$.

The trough A, of the usual material and constructive form, and operating machinery, is mounted upon a properly constructed frame, B.

The material to be cut is entered in said trough, and is fed to the cutting-point by the action of the feed-rollers C C'.

At its end the trough A has a metallic bottom and face-edge $a$, the latter to resist the dash of the cutter-knife.

The fly or balance-wheel D, constructed of the required size and weight, to counteract any irregularities of motion on part of the feed devices, is supported on the shaft E, which rests in proper journal bearings on the frame B, close to the side of the trough A.

On the projecting arms $d$, of the fly-wheel D, I have arranged the cutter-knife F of such circular construction, that the same shall form an eccentric relative to the shaft E, and which, in its cutting-action, shall have a drawing cut, entering the stuff gradually, without shock or jar.

The constructive form of said cutter is plainly shown in fig. 2.

The "feather" or spring lever F', pivoted at $b$ to the frame B, and properly secured to the end of the shaft E, I arrange so that, by its springing action, the cutter-knife is caused to rotate so as to cut against or close up to the face of the plate $a$ of the trough, and in passing clear it freely.

The construction and action of the feed devices are as follows:

On the shaft E I secure a cam, $e$, to rotate within the slotted overhanging lever arm G, pivoted at $g$ to the main lever H, which, in its turn, has its fulcrum at $h$ on the frame B.

Said lever H has its movements guided within the slotted vertical guide H', also secured to the frame B, and is regulated by the set-screw $h'$.

To said lever H I also attach the ratchet-pawl I, constructed so as to impel the movements of the ratchet-wheel J, secured to the lower shaft $c$, and about which the lower feed-roller C revolves.

Said shaft $c$ has its journals resting in proper bearings secured to the bottom of the trough sides A.

Furthermore, I attach to the sides of the hopper or trough A the bell-crank lever K, having its arms respectively pivoted with the cam-arm G at $k$, and at $k'$, in connection with the ratchet-lever L, engaging in the teeth of the upper ratchet-wheel M, secured to the shaft $c'$. Said shaft carries with it the upper feed-roller C'.

The eccentric action of the cam $e$ gives a reciprocating motion to the respective levers, which in their turn operate the pawl-and-ratchet devices, and thus impart to each roller that intermittent rotary action required to feed forward the straw or stuff preparatory to the cutting action of the knife.

A return movement on the part of the ratchet-wheels is prevented by the arrangement of the pawls $i\ i'$ secured to the trough and frame, respectively, as shown in fig. 1.

The feed-rollers C C' I construct of cast-iron, having their entire circumferential faces corrugated with depressions, and forming V-shaped ridges, as shown in figs. 3 and 4. By this means the feed material is very readily and perfectly fed to the cutter-edge.

To allow, however, for more or less material to be fed between said rollers, I have arranged the shaft $c'$ (carrying the upper roller) to operate adjustably in proper slots on each side of the hopper A, and support the journals of said shaft in the projecting bearings $n$ of the sliding standard N, which passes vertically down each side of the trough A, having its bottom piece connecting with a spring bar, O, which has its curved end attached at $o$ to the bottom of the trough.

It is evident that the tension of the spring bar O and its connection with the sliding standard forces down the journals of the upper roller C', and thus the stuff between the rollers, being under pressure, is carried forward as required.

The journals of each roller are sufficiently protected by the trough boards, as at *a*, and also in front of said rollers, the metallic plate *a'* hung loosely in the side bearings, prevent any clogging action of the feed in its passage to the cutter.

The fly-wheel is provided with handle *d'*, when operated by hand-power, although it is plain that, by adding to the fly-wheel proper belting or rope attachments my said machine is readily adapted to be operated by horse or steam power.

Having thus fully described my said invention,

What I claim is—

The arrangement of the fly-wheel D, its knife F, shaft E, feather spring F', cam *e'*, slotted cam-lever G, pivoted and connected to angle-lever K, lever H, guide H', set-screw *h'*, ratchet devices L I J M, pawls *i i'*, corrugated feed-roller O O', plate *a'*, sliding standard M, spring bar O, when all said parts are combined and constructed to operate substantially in the manner and for the purpose described.

In testimony of said invention I have hereunto set my hand in presence of—

CHRISTOPH KEMPER.

Witnesses:
GOTTLIEB BUSKE,
JOSEPH KESSLER.